Figure 1:
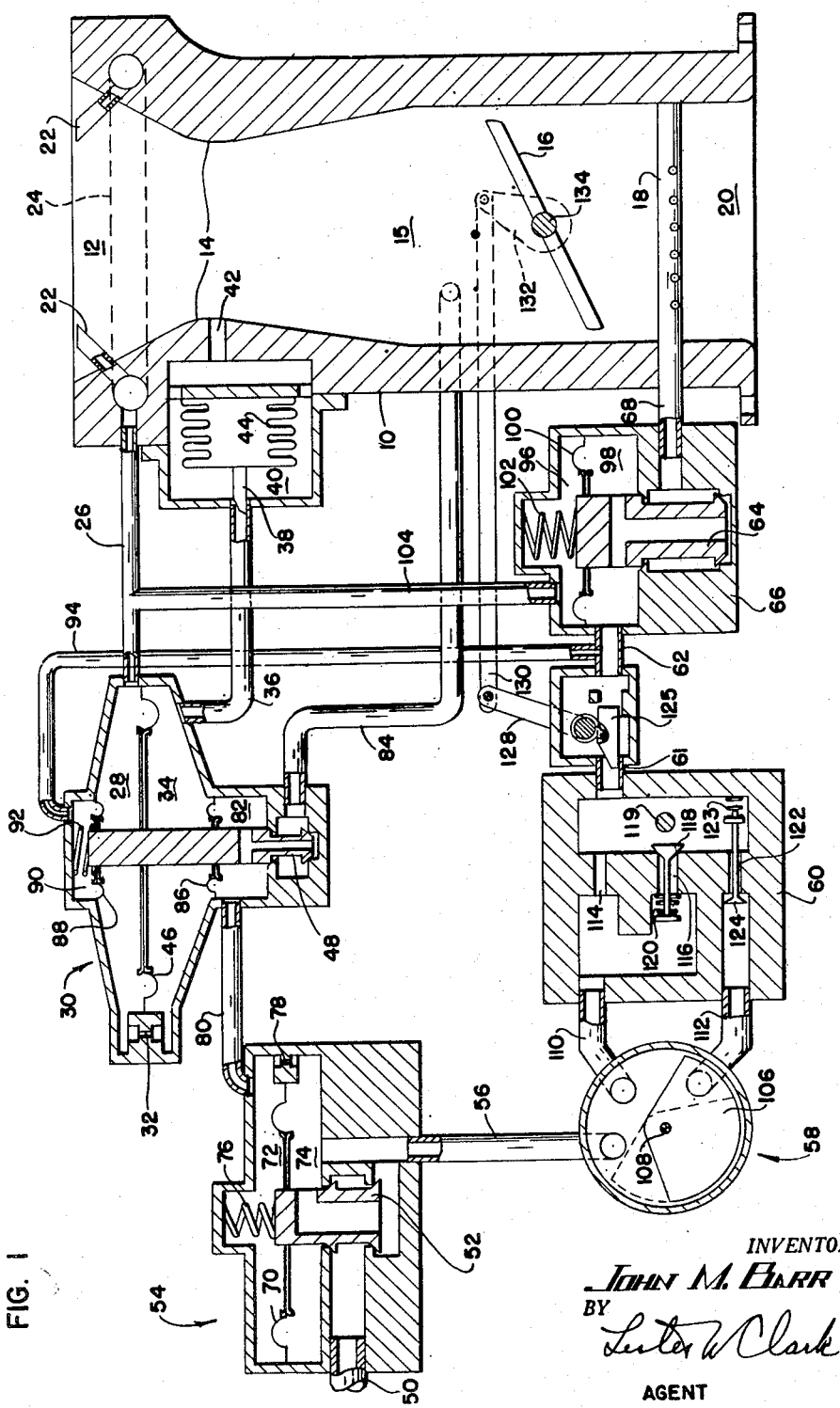

Sept. 20, 1949.   J. M. BARR   2,482,396
CARBURETOR
Filed Dec. 7, 1944   3 Sheets-Sheet 1

INVENTOR.
JOHN M. BARR
BY
Lester W Clark
AGENT

Sept. 20, 1949.                J. M. BARR                    2,482,396
                               CARBURETOR
Filed Dec. 7, 1944                                      3 Sheets-Sheet 2
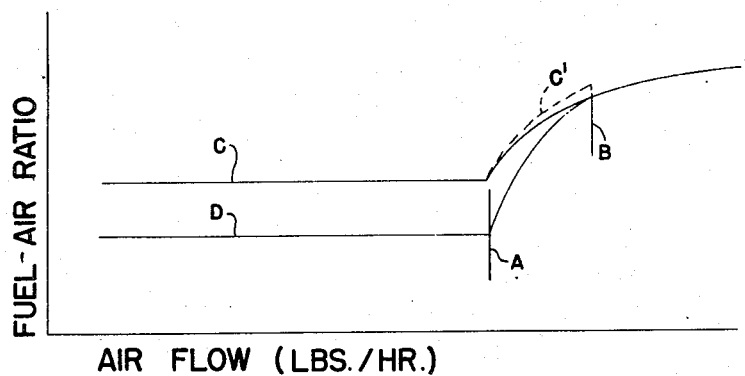
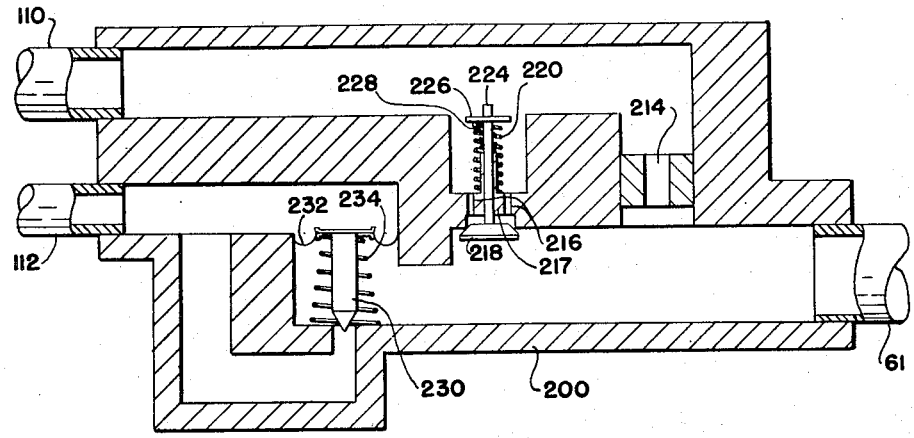
INVENTOR.
John M. Barr
BY
Lester W Clark
AGENT Sept. 20, 1949.  J. M. BARR  2,482,396
CARBURETOR Filed Dec. 7, 1944  3 Sheets-Sheet 3

FUEL-AIR RATIO

AIR FLOW (LBS./HR.)

INVENTOR.
JOHN M. BARR
BY
Lester W Clark
AGENT

Patented Sept. 20, 1949

2,482,396

UNITED STATES PATENT OFFICE 2,482,396

CARBURETOR

John M. Barr, Meriden, Conn., assignor, by mesne assignments, to Niles-Bement-Pond Company, West Hartford, Conn., a corporation of New Jersey Application December 7, 1944, Serial No. 566,974

22 Claims. (Cl. 261—41)

The present invention relates to carburetors for internal combustion engines, and particularly to means for controlling the fuel-to-air ratio in such carburetors.

Certain types of carburetors in common use on aircraft engines are provided with a metering mechanism for measuring the flow of air to the engine, and with means responsive to the air flow to control the fuel flow so that the fuel-to-air ratio is maintained within predetermined limits. In order to control the fuel flow, one or more metering restrictions are usually provided in the fuel conduit, and the fuel pressure differential across these restrictions is controlled by air flow responsive mechanism to maintain the fuel-to-air ratio substantially constant. Where it is desired to select different values for the fuel-to-air ratio, it is common to provide means for varying the total cross-sectional area of the restrictions open to the flow of fuel.

In modern aircraft carburetors, it is common to provide a manually operable valve which may be used to open either one or both of two parallel metering restrictions to the flow of fuel. When one metering restriction only is open, a lean fuel-to-air ratio is obtained, and when both are open, a rich fuel-to-air ratio is obtained. It is also customary to provide means for enriching the mixture of fuel and air when the load on the engine exceeds a predetermined value, regardless of the position in which the manual mixture control valve is set. It has been suggested, in the co-pending application of Scott F. Hunt, Serial No. 498,151, filed August 11, 1943, which matured into Patent No. 2,450,831, issued October 5, 1948, to provide means whereby the enrichment of the fuel and air mixture takes place at different values of engine load when the manual mixture control is in its different positions. The enrichment of the fuel-to-air ratio in response to engine load is sometimes accomplished by means of a valve controlling the flow thru one of the metering restrictions and subject to the fuel pressure diffrential to control its opening movement.

When the engine is operating under maximum power output conditions, it is desirable to maintain a predetermined value of fuel-to-air ratio, regardless of the position of the manual mixture control.

It is desirable to be able to design a carburetor to produce a given fuel-to-air ratio at a given air flow and a given setting of the manual mixture control. In carburetors intended for use on different types of engines, it may be desirable to vary the relationships between these factors over a wide range, in order to secure optimum engine operating conditions.

An object of this invention is, therefore, to construct a carburetor in which the relationships between these factors may be varied over a wide range.

Another object of the present invention is to provide, in a carburetor of the type in which enrichment is secured by the use of a fuel pressure differential responsive valve, means for controlling the increment of valve opening obtained in response to a given increment of fuel pressure differential.

Another object is to provide, in a carburetor of the type described, means for controlling the rate of opening of the enrichment valve as a function of the enrichment valve position.

Another object is to provide improved means for varying the rate of opening of the enrichment valve as a function of the position of the manual mixture control valve.

Another object of the invention is to provide improved means for varying the difference between the values of fuel pressure differential at which the enrichment valve opens when the mixture control valve is in its lean and rich positions.

A further object is to provide improved means for setting the fuel flow at a predetermined value when the fuel pressure differential reaches a selected point, regardless of the position of the mixture control valve means.

Figures 4, 5:
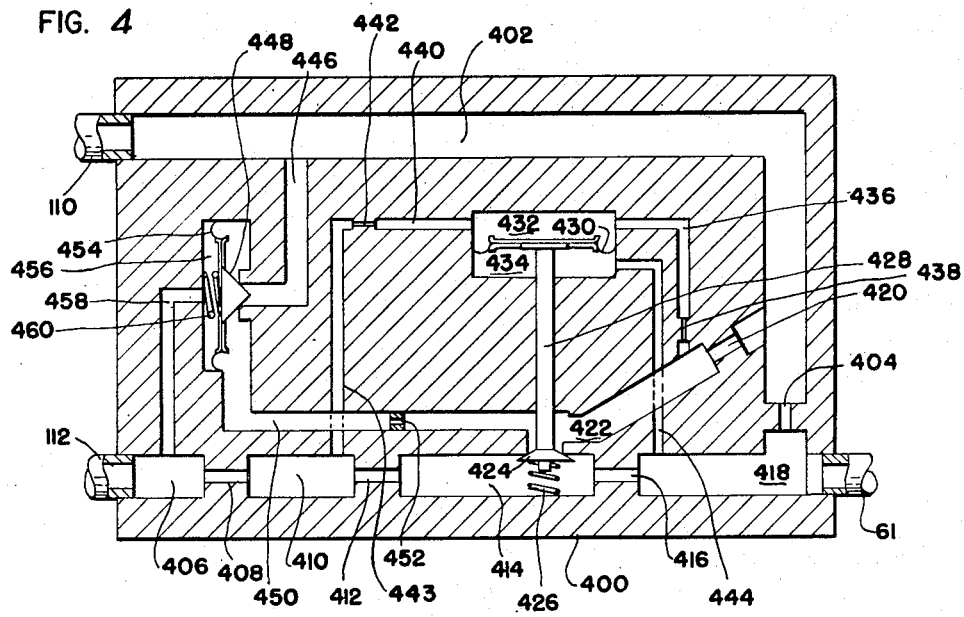

Other objects and advantages of the present invention will become apparent from a consideration of the appended specification, claims and drawing, in which Figure 1 is a somewhat diagrammatic illustration of a carburetor for an aircraft type internal combustion engine including a mixture control and jet system built in accordance with certain of the principles of my invention, Figure 2 is a graphical illustration of the relationship between the fuel-to-air ratio and the air flow in the carburetor of Figure 1, Figures 3 and 4 illustrate two modified forms of jet systems which may be used in place of the jet system shown in the carburetor of Figure 1, and Figure 5 is a graphical illustration of the relationships between fuel-to-air ratio and air flow which are obtainable with the jet system of Figure 4.

Referring to the drawings, there is shown in Figure 1 a body 10 of a carburetor for an aircraft type internal combustion engine. Air enters the carburetor body 10 at an inlet 12 and flows thru a Venturi restriction 14 and a passage 15, past a throttle 16 and a fuel discharge nozzle 18 to an outlet 20. A supercharger may be provided between the outlet 20 and the intake manifold of the engine. In certain cases the supercharger may be upstream from the inlet 12, or two superchargers may be used, one in each place.

The Venturi restriction 14 produces a pressure differential between the inlet 12 and the throat of the restriction which varies substantially in accordance with the square of the velocity of the air passing thru the restriction. Since the cross-sectional area of the venturi is constant, this pressure differential may be taken as a measure of the volume of air flowing thru the passage per unit time.

The pressure differential between entrance 12 and the throat of venturi 14 is utilized to create an air flow thru a secondary air passage extending from entrance 12 to the throat of venturi 14. A plurality of impact tubes 22 are provided, whose open ends project into the entrance 12 to receive the impact of the entering air. The secondary air passage may be traced from entrance 12, thru tubes 22, a passage 24 interconnecting the impact tubes, a conduit 26, a chamber 28 in a fuel meter generally indicated at 30, a restriction 32, a chamber 34 in the fuel meter 30, a conduit 36, past a valve 38 into a chamber 40, and thence thru a conduit 42 to the throat of venturi 14.

The valve 38 is operated by a sealed bellows 44 mounted in the chamber 40. The bellows 44 is fixed at one end, so that the position of the free end, to which valve 38 is attached, varies in accordance with the air pressure in the chamber 40. The bellows 44 is preferably filled with nitrogen or some other suitable temperature responsive fluid, so that the position of valve 38 varies not only with the pressure but with the temperature of the air in the chamber 40, and hence with the density of that air.

In the secondary air passage, the pressure differential between the entrance 12 and the throat of venturi 14 is divided into two component pressure drops, one across the restriction 32 and the other across the valve 38. The valve 38, as previously mentioned, is positioned in accordance with the density of the air flowing thru the passage 15. Valve 38 is moved toward open position as the air density increases and toward closed position as the air density decreases. If the volume of air flowing per unit time thru passage 15 remains constant while its density decreases, then the mass of air flowing is decreased, but the pressure differential set up by the venturi 14 remains constant. However, the movement of valve 38 toward closed position causes the component pressure drop across valve 38 to increase, and the component pressure drop across restriction 32 to decrease, reflecting the decrease in the mass of air flowing. By proper design of valve 38, the pressure drop across restriction 32 may be made to vary substantially in accordance with the mass of air flowing thru passage 15. This pressure differential across restriction 32 acts on a diaphragm 46 which separates the chambers 28 and 34. The force applied to diaphragm 46 is transmitted to a valve 48, on which it acts in a closing direction.

The fuel enters the carburetor from a fuel pump or other source of fuel under superatmospheric pressure. It flows thru a conduit 50, a valve 52 in a pressure regulator 54, a conduit 56, a mixture control valve mechanism generally indicated at 58, a jet system 60, a conduit 61, an idle valve 125, a conduit 62, a valve 64 in a pressure regulator 66, and a conduit 68 to the fuel discharge nozzle 18.

The pressure regulator 54 includes a diaphragm 70 separating a pair of expansible chambers 72 and 74 and connected at its center to the valve 52. A spring 76 biases the valve 52 toward open position. A restriction 78 connects the chambers 72 and 74.

A portion of the fuel entering pressure regulator 54 flows thru chamber 74, restriction 78, chamber 72, a conduit 80, a chamber 82 in the fuel meter 30, past the valve 48, and thru a conduit 84 to the main air passage 15. Alternatively, the conduit 84 may lead to the fuel tank, the fuel pump inlet, the fuel conduit 62, or elsewhere, as long as it leads to a point maintained at a pressure continuously lower than that in chamber 82.

The fuel meter 30 includes a diaphragm 86 separating the chambers 34 and 82 and a diaphragm 88 separating the chamber 28 from a fourth expansible chamber 90. The valve 48 is biased toward closed position by a spring 92.

The chamber 90 is connected thru a conduit 94 to the fuel conduit 62 downstream from the jet system 60. The pressure in chamber 90 is therefore the same as that in the fuel line downstream from the jet system. The pressure in chamber 82 is the same as that in chamber 72 of pressure regulator 54.

The position of diaphragm 70 and valve 52 is determined by the balance between the spring 76 plus the pressure in chamber 72 acting in a valve opening direction and the pressure in chamber 74 acting in a valve closing direction. If the balance between these forces is upset, the diaphragm 70 and valve 52 move, thereby varying the pressure in chamber 74 until the balance is restored. Since the pressures in chambers 72 and 74, under equilibrium conditions, differ by a substantially constant amount dependent on the strength of spring 76, the pressure in chamber 72 may be used as a measure of the pressure in chamber 74, which is substantially the same as the pressure on the upstream side of the jet system 60.

For any given constant cross-sectional area of the fuel passages thru the jet system 60, the pressure differential across it is a measure of the fuel flow thru it. This pressure differential, or rather a smaller pressure differential which is a measure of the pressure differential across the jet system, is applied thru the diaphragms 86 and 88 of pressure meter 30 to the valve 48, on which it acts in an opening direction.

From the foregoing, it may be seen that the valve 48 is positioned in accordance with the balance between two forces, one of which varies in accordance with the mass of air entering the carburetor, and the other in accordance with the mass of fuel entering the carburetor. Furthermore, the valve 48 controls the mass of fuel entering the carburetor, since it controls the pressure in chamber 72. The pressure in the chamber 82 is transmitted to chamber 72 of pressure regulator 54 where it controls the position of valve 52 and hence the pressure on the upstream side of the jet system 60.

The pressure regulator 66 operates to maintain a substantially constant pressure on the downstream side of the jet system 60.

The pressure regulator 66 includes a pair of expansible chambers 96 and 98 separated by a flexible diaphragm 100, which is attached at its center to the valve 64. A spring 102 biases the valve 64 toward closed position. The chamber 96 is connected thru a conduit 104 to the conduit 26 and thence thru the passage 24 and impact tubes 22 to the air entrance 12. The chamber 98 is connected to the conduit 62.

The mixture control 58 includes a disc valve 106 fixed on a shaft 108. The disc valve 106 controls the flow of fuel thru ports opening into conduits 110 and 112 which lead into the jet system 60. When the disc 106 is in the position illustrated in full lines in the drawing, fuel can flow to the jet system only thru the conduit 110. This full line position of the disc valve 106 is known as the "lean" position of the mixture control 58. When the disc valve 106 is in the dotted line position shown in the drawing, the fuel can flow thru both the conduits 110 and 112. The dotted line position of disc valve 106 is termed the "rich" position of the mixture control. The disc valve 106 can also be moved to a "cut-off" position wherein it cuts off the flow thru both conduits 110 and 112.

The conduit 110 conducts fuel either thru a fixed restriction or jet 114, or thru a restriction 116 controlled by an enrichment valve 118 biased to closed position by a spring 120.

The conduit 112 conducts fuel to a restriction 122 controlled by a valve 124. The valve 124 is biased toward open position by a spring 123.

The enrichment valve 118 is normally closed, but opens at high fuel pressure differentials across the jet system to increase the fuel-to-air ratio under heavy load conditions. A stop 119 may be provided to limit the opening movement of valve 118.

When the mixture control is in its rich position, both the restrictions 114 and 122 are open to the flow of fuel. Let it be assumed that the valve 118 and the spring 120 are so designed that the valve 118 opens when the fuel pressure differential reaches a value corresponding to an air flow indicated by the ordinate A in Figure 2. Let it be further assumed that the valve 124 and spring 123 are so related that the valve 124 closes when the fuel pressure differential reaches a value corresponding to the air flow indicated by the ordinate B in Figure 2.

When the mixture control 58 is in its rich position, the fuel-to-air ratio is maintained constant at the value indicated by the abscissa C in Figure 2 until the air flow corresponding to A is exceeded, whereupon the valve 118 opens. As the air flow continues to increase above that value, the fuel pressure differential is correspondingly increased and the valve 118 gradually opens wider, thereby increasing the fuel-to-air ratio along the dotted curve C' in Figure 2. When the air flow corresponding to ordinate B is reached, the valve 124 closes. Since valve 124 is of a type which is inherently self-closing, it will snap to its closed position once it starts to move, thereby causing the sudden drop at the right end of curve C'.

When the mixture control 58 is in its lean position, the fuel-to-air ratio has the substantially constant value indicated by the abscissa D in Figure 2 until the air exceeds the value indicated by the ordinate A. When the air flow exceeds that value, the valve 118 opens gradually, thereby increasing the fuel-to-air ratio. There is never any flow thru the restriction 122 when the mixture control 58 is in its lean position. It should be noted that for air flows greater than that indicated by the ordinate B, the cross-sectional area of the restrictions open to the flow of fuel is the same, regardless of the position of the mixture control 58. Therefore, the fuel-to-air ratio at such times is independent of the position of the mixture control.

At very low air flows, such as are encountered under idling conditions, the pressure differential set up by the venturi 14 tends to be erratic, and is not a reliable indication of the volume of air entering the engine. Provision is made to control the fuel flow in accordance with the throttle position at such times. The spring 92 in the pressure meter 30 acts on valve 48 in a closing direction. When the differential pressure acting on diaphragm 46 is small, as under low air flow conditions, the spring 92 becomes the predominating force acting on valve 48. A closing movement of valve 48 causes an increase in the fuel flow thru the main fuel line, since the closure of valve 48 increases the pressure in chamber 82 of fuel meter 30 and hence in chamber 72 of pressure regulator 54. Furthermore, the spring 76 of pressure regulator 54 biases valve 52 in an opening or fuel flow increasing direction.

The idle valve 125 is pivotally attached to a lever 128, whose opposite end is connected by a link 130 to an arm 132 fixed on the shaft 134 of throttle 16. The idle valve is normally wide open when the throttle is beyond a range of positions near its closed position, usually termed the idling range. As the throttle moves into the idling range, thereby decreasing the air flow, the idle valve 125 moves toward closed position. At the same time, the springs 92 and 76 cause operation of valve 52 in an opening direction. The valve 52 is thereby opened sufficiently so that its restrictive effect on the fuel flow is less than that of the idle valve 125. Therefore the fuel flow under idling conditions is controlled primarily by the valve 125 in accordance with the position of the throttle, and not by the fuel meter 30 in accordance with the mass of air entering the engine.

While I have illustrated a particular type of carburetor, it will be appreciated by those skilled in the art that my invention may be applied with equal facility to other types of carburetors. The carburetor illustrated may, for example, be modified by omitting the pressure regulator 54 and placing the valve 48 of the fuel meter 30 directly in the fuel line between the pump and the mixture control 58. This would require that the valve 48 be reversed so that it would open in a downward direction and close in an upward direction, the same as the present valve 52.

*Figure 3*

There is illustrated in Figure 3 a jet system 200, which may be used in place of the jet system 60 of Figure 1. When the jet system shown in Figure 3 is used, it is connected to the conduits 110, 112 and 61 of Figure 1, as indicated by the same reference numerals applied to the corresponding conduits of Figure 3. The jet system 200 includes a jet or restriction 214 which corresponds in structure and function to the jet 114 of Figure 1. The jet system 200 also includes a restriction 216 corresponding generally to the restriction 116 of Figure 1. The restriction between valve 230 and its seat corresponds generally to the restriction 122 of Figure 1.

The flow of fuel thru restriction 216 is controlled by a valve 218 biased to closed position by a spring 220. The valve 218 is attached to a stem 224, which carries near its upper end a retainer 226. The stem 224 passes thru a wall in which the orifices 216 are drilled. The spring 220 is retained between the upper surface of the wall and the retainer 226. A small pick-up spring 228 surrounds the valve stem 224 between the wall 217 and the retainer 226. The spring 228 is so designed that its free length is less than the distance between the upper surface of wall 217 on which it rests and the retainer 226 when the valve is in its closed position. As the valve 218 opens, the retainer 226 moves downwardly and engages spring 228. This increases the force opposing opening of the valve, and thereby reduces the magnitude of the increment of valve movement obtained in response to a given increment of fuel pressure differential. The opening movement of the valve is thereby slowed, so that the rate of increase of the fuel-to-air ratio with increasing fuel pressure differential is correspondingly reduced.

The stem of valve 230 is attached to the center of a flexible diaphragm 232 whose opposite sides are subject to the pressures upstream and downstream from the valve 230. The valve 230 is biased to open position by a spring 234.

When the mixture control is in its rich position, so that fuel may flow thru conduit 112, the diaphragm 232 is subject to the pressure drop across valve 230, which is the same as the fuel pressure differential across the jet system. As long as this pressure drop is insufficient to overcome the spring 234, the valve remains open. When that pressure drop exceeds a value determined by the strength of spring 234, the area of the diaphragm 232, and the area of valve 230, the valve moves toward closed position. These factors are preferably so designed that the valve 230 is completely closed when the air flow corresponding to abscissa D is reached.

It may be seen that the jet system of Figure 3 functions in much the same way as the jet system 60 of Figure 1. The chief functional difference is that the rate of movement of the valve 218 is controlled in accordance with its position by the use of the pick-up spring 228. It is, therefore, possible to regulate the variation of fuel-to-air ratio with air flow more closely in the jet system of Figure 3.

Figure 4

There is shown in Figure 4 a jet system 400 which may be used in place of the jet system 60 of Figure 1. In the jet system 400, improved means are provided: (1) for regulating the rate of opening of the enrichment valve in response to the fuel pressure differential; (2) for regulating the rate of opening of the enrichment valve as a function of the mixture control position; (3) for setting the difference between the values of fuel pressure differential at which the enrichment valve opens when the mixture control is in its lean and rich positions; and (4) for determining the maximum flow thru the jet system under maximum power output conditions.

In Figure 4, the conduit 110 leads into a passage 402 in the jet system, which communicates thru a jet or restriction 404 with the outlet passage 61. The jet 404 corresponds to the jet 114 of Figure 1.

Fuel entering the jet system 400 thru the conduit 112 passes thru an inlet passage 406, a restriction 408, a chamber 410, a restriction 412, a chamber 414, and a restriction 416 to the outlet chamber 418.

Fuel may also flow from the inlet passage 402 thru a restriction 420, a passage 422, and an enrichment valve 424 to the chamber 414.

The enrichment valve 424 is biased to closed position by a spring 426. The valve 424 is mounted on a stem 428 whose opposite end is attached to a flexible diaphragm 430 which separates a pair of expansible chambers 432 and 434. The chamber 432 is connected thru a passage 436 and a restriction 438 to the passage 422. The chamber 432 is also connected thru a passage 440, a restriction 442 and a passage 443 to the chamber 410. The chamber 434 is connected thru a passage 444 to the outlet chamber 418.

A by-pass connection is provided around the restriction 420. This by-pass connection may be traced from inlet passage 402 thru a passage 446, a valve 448, a passage 450, and a restriction 452 therein to the passage 422 on the upstream side of valve 424. The valve 448 is controlled by a diaphragm 454, which is exposed on one side to the pressure in the passage 450 and on its opposite side to the pressure in a chamber 456 which is connected thru a passage 458 to the inlet chamber 406. A spring 460 biases the valve 448 to closed position.

Operation of Figure 4

When the mixture control is in its lean position, fuel enters the jet system 400 only thru the inlet conduit 110. There are then only two passages open to the flow of fuel thru the jet system as long as the valve 424 remains closed. One of these two passages is thru the fixed restriction 404 to the outlet chamber 418. The other passage is thru inlet passage 402, restriction 420, restriction 438, passage 436, chamber 432, passage 440, restriction 442, passage 443, chamber 410, restriction 412, chamber 414, and restriction 416 to the outlet chamber 418. Fuel may also enter the restriction 438 thru passage 446, valve 448, passage 450, restriction 452, and passage 422. The pressure in passage 450 is at this time much higher than that in inlet chamber 406, and, therefore, the valve 448 is moved to open position. It may be seen that the restrictions in all the passages traced above are fixed, with the sole exception of valve 448, which is at this time substantially wide open. Therefore, the fuel-to-air ratio remains substantially constant as the air flow and the fuel pressure differential vary. The constant value of fuel-to-air ratio obtained under these conditions is illustrated by the abscissa E in Figure 5.

The particular value of air flow at which the enrichment valve 424 opens is determined under these conditions by the relationship between the pressure in chamber 432 and the pressure in the inlet passage 402. The relationship between these two pressures is determined by the relative sizes of the jets 420, 438 and 452 on the one hand and the jets 442, 412 and 416 on the other hand. An increase in the size of any of the jets 420, 438 or 452 tends to increase the pressure in the chamber 432 and thereby to reduce the value of air flow at which the valve 424 opens. On the other hand, an increase in size of any of the jets 442, 412 or 416 tends to decrease the pressure in chamber 432 and thereby to increase the value of air flow at which the valve 424 begins to open. By proper design of these jets, the value of air flow at which valve 424 opens may be set, for example, at the values indicated at F and G in Figure 5.

When the enrichment valve 424 opens, the pressure in chamber 422 drops. This causes a decrease in the flow thru restriction 438 and a decrease in the pressure in chamber 432. It may, therefore, be seen that the valve 424 tends to stabilize itself. In other words, as the valve moves toward open position, it decreases the force moving it toward open position until a balance is struck between the opening force and the closing force of spring 426. The rate of opening, or the increment of opening movement of valve 424 which is obtained from a given increment of fuel pressure differential, may be chosen as desired by varying the relative proportions of the restrictions 420 and 438. For example, it may be seen that if restriction 420 were omitted, then the opening movement of valve 424 would have substantially no effect on the pressure in passage 422, and the opening movement would be fairly rapid. However, if the restriction 420 were used and the restriction 438 were omitted, then the pressure drop in passage 422 accompanying the opening of the valve would be communicated to chamber 432 directly, and the valve opening movement obtained for a given increment of fuel pressure differential would be very small. By designing the jets 420 and 438, the relationship between fuel-to-air ratio and air flow might be made to vary, for example, along the curves H and K of Figure 5.

When the mixture control is in its rich position, fuel may enter the jet system 400 thru both the conduits 110 and 112. In addition to the passages open to the flow of fuel when the mixture control is in its lean position, there is then an additional passage open which may be traced thru inlet chamber 406, restriction 408, chamber 410, restriction 412, chamber 414, and restriction 416 to outlet chamber 418.

The pressure in inlet chamber 406 is now equal to or slightly greater than the pressure in passage 450, so that the spring 460 moves the valve 448 to closed position. The pressure in passage 422 is thereby decreased, since it is now supplied with fuel only thru the restriction 420, instead of thru restrictions 420 and 452 in parallel. At the same time, however, the pressure in chamber 410 is increased, and this change is reflected in an increase in pressure in the chamber 432, since the two are connected by passage 440 and restriction 442. If the restriction 438 is made smaller than the restriction 442, then the effect of the decreased pressure in passage 422 on the pressure in chamber 432 will be less than the effect of the increased pressure in chamber 410 on the pressure in chamber 432. There will, therefore, be an increase in the pressure in chamber 432 for a given fuel pressure in the inlet passages 402 and 406 over the pressure obtained in chamber 432 when the mixture control was in its lean position. Because of this increased pressure in chamber 432, the valve 424 opens at a lower value of the fuel pressure differential when the mixture control is in its rich position than when the mixture control is in its lean position.

The pressure drop across the valve 424 is now smaller than it was when the mixture control was in its lean position because of the decrease in pressure in passage 422 due to the closing of valve 448 and because of an increase in pressure in chamber 414 due to the increased pressure drop across restriction 416. The fuel flow thru valve 424, therefore, increases more slowly as the valve opens than was the case when the mixture control was in its lean position. By properly proportioning the restrictions 452, 416, and 412, the rate of increase of the fuel-to-air ratio when the mixture control is in its rich position may be controlled as desired. For example, any of the curves indicated at L in Figure 5 may be obtained.

The flow thru the restrictions 438 and 442 in series is greater when the mixture control is in its lean position than when the mixture control is in its rich position, because of the greater pressure differential between the passages 422 and 410. By properly proportioning the restrictions 438 and 442, the maximum fuel flow obtained thru the jet system at the maximum air flow may be made the same in both lean and rich positions of the mixture control.

The valve 448 and its associated controlling and controlled passages may be omitted, if found unnecessary. The use of this portion of my invention extends the range of usable values for the air flow at which valve 424 starts to open and for the rate of opening of valve 424 when the mixture control is in its lean position.

While I have shown and described certain preferred embodiments of my invention, other modifications thereof will readily occur to those skilled in the art, and I therefore intend my invention to be limited only by the appended claims.

I claim as my invention:

1. A fuel supply system for an internal combustion engine, comprising a conduit for fuel flowing to said engine, a jet system including a plurality of metering restrictions in said conduit for regulating the flow of fuel therethru in accordance with the fuel pressure differential across said restrictions, means for varying said fuel pressure differential, manually operable valve means for selectively opening said restrictions to the flow of fuel and movable between a first position wherein a first restriction is open and a second position wherein said first restriction and a second restriction are open, a third restriction in parallel with said first restriction, an enrichment valve for controlling the flow thru said third restriction, means biasing said enrichment valve to closed position, means subject to said fuel pressure differential for moving said enrichment valve toward open position when said pressure differential exceeds a first predetermined value, a second valve for additionally controlling the flow thru said second restriction, means biasing said second valve to open position, and operating means subject to said fuel pressure differential for moving said second valve toward closed position, said operating means being effective to close said second valve when said fuel pressure differential reaches a second predetermined value greater than said first predetermined value, so that when said fuel pressure differential reaches said second value, only said first and third restrictions are open, regardless of the position of said manually operable valve means.

2. A fuel supply system for an internal combustion engine, comprising a conduit for fuel flowing to said engine, a plurality of metering restrictions in said conduit for regulating the flow of fuel therethru in accordance with the fuel pressure differential across said restrictions, means for varying said fuel pressure differential, valve means for selectively opening said restrictions to the flow of fuel and movable between a first position wherein a first predetermined value is established for the cross-sectional area of the open restrictions and a second position wherein a second predetermined value greater than said first predetermined value is established for said cross-sectional area, and means effective when said valve means is in either of said first or second positions and said pressure differential exceeds a predetermined value to establish a predetermined value for said open cross-sectional area, said last-named means including a valve for controlling a restriction which is opened only when said valve means is in its second position, means biasing said valve to open position, and means subject to said pressure differential for closing said valve when said pressure differential exceeds said predetermined value.

3. A fuel supply system for an internal combustion engine, comprising a conduit for fuel flowing to said engine, a jet system including a plurality of metering restrictions in said conduit for regulating the flow of fuel therethru in accordance with the fuel pressure differential across said restrictions, means for varying said fuel pressure differential, manually operable valve means for selectively opening said restrictions to the flow of fuel and movable between a first position wherein a first restriction is open and a second position wherein said first restriction and a second restriction are open, a third restriction in parallel with said first restriction, an enrichment valve for controlling the flow thru said third restriction, means biasing said enrichment valve to closed position, means subject to said fuel pressure differential for moving said enrichment valve toward open position when said pressure differential exceeds a first predetermined value, a second valve for additionally controlling the flow thru said second restriction, and means biasing said second valve to open position, said second valve having opposed surfaces subject to said fuel pressure differential so that said second valve is moved toward closed position by the pressure differential acting on it, said second valve being effective to close when said fuel pressure differential reaches a second predetermined value greater than said first predetermined value, so that when said fuel pressure differential reaches said second value, only said first and third restrictions are open, regardless of the position of said manually operable valve means.

4. A fuel supply system for an internal combustion engine, comprising a conduit for fuel flowing to said engine, a jet system including a plurality of metering restrictions in said conduit for regulating the flow of fuel therethru in accordance with the fuel pressure differential across said restrictions, means for varying said fuel pressure differential, manually operable valve means for selectively opening said restrictions to the flow of fuel and movable between a first position wherein a first restriction is open and a second position wherein said first restriction and a branch conduit including a second restriction are open, a third restriction in parallel with said first restriction, an enrichment valve for controlling the flow thru said third restriction, means biasing said enrichment valve to closed position, means subject to said fuel pressure differential for moving said enrichment valve toward open position when said pressure differential exceeds a first predetermined value, a second valve in said branch conduit between said valve means and said second restriction for controlling the flow thru said second restriction, means biasing said second valve to open position, and a diaphragm subject to the pressure drop across said second valve for moving said second valve toward closed position, said diaphragm being effective to close said second valve when said fuel pressure differential reaches a second predetermined value greater than said first predetermined value, so that when said fuel pressure differential reaches said second value, only said first and third restrictions are open, regardless of the position of said manually operable valve means.

5. A fuel supply system for an internal combustion engine, comprising a conduit for fuel flowing to said engine, a jet system including a plurality of metering restrictions in said conduit for regulating the flow of fuel therethru in accordance with the fuel pressure differential across said restrictions, means for varying said fuel pressure differential, manually operable valve means for selectively opening said restrictions to the flow of fuel and movable between a first position wherein a first restriction is open and a second position wherein said first restriction and a second restriction are open, a third restriction in parallel with said first restriction, an enrichment valve for controlling the flow thru said third restriction, means biasing said enrichment valve to closed position, means subject to said fuel pressure differential for moving said enrichment valve toward open position when said pressure differential exceeds a first predetermined value, means for varying the rate of opening of said enrichment valve in response to said fuel pressure differential as a function of the position of said valve, a second valve for additionally controlling the flow thru said second restriction, means biasing said second valve to open position, and operating means subject to said fuel pressure differential for moving said second valve toward closed position, said operating means being effective to close said second valve when said fuel pressure differential reaches a second predetermined value greater than said first predetermined value, so that when said fuel pressure differential reaches said second value, only said first and third restrictions are open, regardless of the position of said manually operable valve means.

6. A fuel supply system for an internal combustion engine, comprising a conduit for fuel flowing to said engine, a jet system including a plurality of metering restrictions in said conduit for regulating the flow of fuel therethru in accordance with the fuel pressure differential across said restrictions, means for varying said fuel pressure differential, manually operable valve means for selectively opening said restrictions to the flow of fuel and movable between a first position wherein a first restriction is open and a second position wherein said first restriction and a second restriction are open, a third restriction in parallel with said first restriction, an enrichment valve for controlling the flow thru said third restriction, means biasing said enrichment valve to closed position, means subject to said fuel pressure differential for moving said enrichment valve toward open position when said pressure differential exceeds a first predetermined value, pickup spring means for varying the rate of opening of said enrichment valve in response to said fuel pressure differential as a function of the position of said valve, a second valve for additionally controlling the flow thru said second restriction, means biasing said second valve to open position, and operating means subject to said fuel pressure differential for moving said second valve toward closed position, said operating means being effective to close said second valve when said fuel pressure differential reaches a second predetermined value greater than said first predetermined value, so that when said fuel pressure differential reaches said second value, only said first and third restrictions are open, regardless of the position of said manually operable valve means.

7. A fuel supply system for an internal combustion engine, comprising a conduit for fuel flowing to said engine, a metering restriction in said conduit for regulating the flow of fuel therethru in accordance with the fuel pressure differential thereacross, means for varying said fuel pressure differential, an enrichment valve connected in parallel with said restriction, means biasing said valve to closed position, means responsive to said fuel pressure differential for moving said enrichment valve toward open position, and means for varying the rate of opening of said enrichment valve in response to said fuel pressure differential as a function of the position of said valve to control the relationship between said fuel pressure differential and the rate of fuel flow, said last-named means comprising a pick-up spring positioned so as to be engaged by said valve at a predetermined point in its travel.

8. A fuel supply system for an internal combustion engine, comprising a conduit for fuel flowing to said engine, a metering restriction in said conduit for regulating the flow of fuel therethru in accordance with the fuel pressure differential thereacross, means for varying said fuel pressure differential, an enrichment valve connected in parallel with said restriction, means biasing said valve to closed position, means for moving said enrichment valve toward open position including a pair of expansible chambers separated by a movable wall and a connection between said wall and said valve, a first passage connecting one of said chambers to said fuel conduit at the upstream side of said restriction, said first passage including at least one metering orifice, a second passage connecting said first passage at the downstream side of said orifice to the upstream side of said enrichment valve, and a third passage connecting the other of said chambers to said fuel conduit at the downstream side of said restriction, said passages cooperating so that the fuel flow thru said valve causes a pressure drop across said orifice and thereby a variation in the relationship between said fuel pressure differential and the pressure differential acting on said movable wall to open said valve.

9. A fuel supply system for an internal combustion engine, comprising a conduit for fuel flowing to said engine, a jet system connected in series in said conduit including a plurality of interconnected passages and restrictions for regulating the flow of fuel thru said conduit in accordance with the fuel pressure differential across said jet system, means for varying said fuel pressure differential, first and second fuel passages connecting one side of said jet system and said conduit, a single passage connecting the other side of said jet system and said conduit, a chamber in said jet system, a first of said restrictions connecting said chamber and said first fuel passage, a second of said restrictions connecting said chamber and said second fuel passage, a third of said restrictions connecting said first passage and said single passage, a fourth of said restrictions connecting said chamber and said single passage, an enrichment valve for controlling the flow thru said first restriction, spring means biasing said valve to closed position, means including a movable wall subject to the pressure drop across said fourth restriction for opening said valve, and valve means for controlling said first and second fuel passages and selectively movable between a first position wherein in only said first fuel passage is open and a second position wherein both said first and second fuel passages are open, said movable wall being effective due to the change in the pressure drop across said fourth restriction when said valve means is moved between said first and second positions to cause opening of said enrichment valve at a first value of said fuel pressure differential when said valve means is in said first position and at a second lower value when said valve means is in said second position.

10. A fuel supply system for an internal combustion engine, comprising a conduit for fuel flowing to said engine, a jet system connected in series in said conduit including a plurality of interconnected passages and restrictions for regulating the flow of fuel thru said conduit in accordance with the fuel pressure differential across said jet system, means for varying said fuel pressure differential, first and second fuel passages connecting one side of said jet system and said conduit, a single passage connecting the other side of said jet system and said conduit, a chamber in said jet system, a first of said restrictions connecting said chamber and said first fuel passage, a second of said restrictions connecting said chamber and said second fuel passage, a third of said restrictions connecting said first passage and said single passage, a fourth of said restrictions connecting said chamber and said single passage, an enrichment valve for controlling the flow thru said first restriction, spring means biasing said valve to closed position, a passage connected in parallel with said valve and including at least two restrictions in series therein, a second chamber connected to said parallel passage between said two restrictions, a movable wall subject on one side to the pressure in said second chamber and on its opposite side to the pressure in said single passage for opening said valve, and valve means for controlling said first and second fuel passages and selectively movable between a first position wherein only said first passage is open and a second position wherein both said first and second fuel passages are open, said movable wall being effective due to the change in the pressure difference acting on it when said valve means is moved between said first and second positions to cause opening of said enrichment valve at a first value of said fuel pressure differential when said valve means is in said first position and at a second lower value when said valve means is in said second position.

11. A fuel supply system for an internal combustion engine, comprising a conduit for fuel flowing to said engine, a jet system connected in series in said conduit including a plurality of interconnected passages and restrictions for regulating the flow of fuel thru said conduit in accordance with the fuel pressure differential across said jet system, means for varying said fuel pressure differential, first and second fuel passages connecting one side of said jet system and said conduit, a third passage connecting the other side of said jet system and said conduit, valve means for controlling said first and second fuel passages and selectively movable between a first position wherein only said first passage is open and a second position wherein both said first and second fuel passages are open, an enrichment valve for controlling the flow of fuel thru one of said restrictions, means biasing said valve to closed position, means for moving said enrichment valve toward open position including a pair of expansible chambers separated by a movable wall and a connection between said wall and said valve, means for controlling the pressure difference acting on said wall as a function of said fuel pressure differential, and means including a valve operable concurrently with said valve means for varying the pressure in one of said chambers in accordance with the position of said valve means, said movable wall being effective due to the change in the pressure difference acting on it when said valve means is moved between said first and second positions to cause opening of said enrichment valve at a first value of said fuel pressure differential when said valve means is in said first position and at a second lower value when said valve means is in said second position.

12. A fuel supply system for an internal combustion engine, comprising a conduit for fuel flowing to said engine, a jet system connected in series in said conduit including a plurality of interconnected passages and restrictions for regulating the flow of fuel thru said conduit in accordance with the fuel pressure differential across said jet system, means for varying said fuel pressure differential, first and second fuel passages connecting one side of said jet system and said conduit, a third passage connecting the other side of said jet system and said conduit, valve means for controlling said first and second fuel passages and selectively movable between a first position wherein only said first passage is open and a second position wherein both said first and second fuel passages are open, an enrichment valve for controlling the flow of fuel thru one of said restrictions, means biasing said valve to closed position, means responsive to said fuel pressure differential for moving said enrichment valve toward open position, means for varying the rate of opening of said enrichment valve in response to said fuel pressure differential as a function of the position of said valve to control the relationship between said fuel pressure differential and the rate of fuel flow, and additional means for varying the rate of opening of said valve as a function of the position of said valve means to provide different functional relationships between the fuel pressure differential and the rate of fuel flow in the two different positions of said valve means.

13. A fuel supply system for an internal combustion engine, comprising a conduit for fuel flowing to said engine, a jet system connected in series in said conduit including a plurality of interconnected passages and restrictions for regulating the flow of fuel thru said conduit in accordance with the fuel pressure differential across said jet system, means for varying said fuel pressure differential, first and second fuel passages connecting one side of said jet system and said conduit, a third passage connecting the other side of said jet system and said conduit, valve means for controlling said first and second fuel passages and selectively movable between a first position wherein only said first passage is open and a second position wherein both said first and second fuel passages are open, an enrichment valve for controlling the flow of fuel thru one of said restrictions, means biasing said enrichment valve to closed position, means for moving said enrichment valve toward open position including a pair of expansible chambers separated by a movable wall and a connection between said wall and said valve, a third chamber in said jet system, a second of said restrictions connecting said chamber and said second passage, a third of said restrictions connecting said chamber and said third passage, a fourth passage connecting said first passage and said chamber and including at least two restrictions in series therein, a connection between one of said expansible chambers and said fourth passage between said two restrictions, and a connection between the other of said expansible chambers and said third passage, said fourth passage being effective due to pressure variations in said third chamber accompanying movements of said valve means to vary the pressure in said one chamber and hence the rate of opening of said valve in accordance with the position of said valve means.

14. A fuel supply system for an internal combustion engine, comprising a conduit for fuel flowing to said engine, a jet system connected in series in said conduit including a plurality of interconnected passages and restrictions for regulating the flow of fuel thru said conduit in accordance with the fuel pressure differential across said jet system, means for varying said fuel pressure differential, first and second fuel passages connecting one side of said jet system and said conduit, a third passage connecting the other side of said jet system and said conduit, valve means for controlling said first and second fuel passages and selectively movable between a first position wherein only said first passage is open and a second position wherein both said first and second fuel passages are open, an enrichment valve for controlling the flow of fuel thru one of said restrictions, means biasing said valve to closed position, means for moving said enrichment valve toward open position including a pair of expansible chambers separated by a movable wall and a connection between said wall and said valve, a fourth passage including a second restriction connecting said first passage and one of said chambers, a fifth passage including a third restriction connecting said one chamber and said third passage, means including a valve for by-passing said second restriction to vary the pressure in said one chamber, and means for operating said valve concurrently with said valve means to vary the rate of opening of said valve in accordance with the position of said valve means.

15. A fuel supply system for an internal combustion engine, comprising a conduit for fuel flowing to said engine, a jet system connected in series in said conduit including a plurality of interconnected passages and restrictions for regulating the flow of fuel thru said conduit in accordance with the fuel pressure differential across said jet system, means for varying said fuel pressure differential, first and second fuel passages connecting one side of said jet system and said conduit, a third passage connecting the other side of said jet system and said conduit, valve means for controlling said first and second fuel passages and selectively movable between a first position wherein only said first passage is open and a second position wherein both said first and second fuel passages are open, an enrichment valve for controlling the flow of fuel thru one of said restrictions, means biasing said valve to closed position, means for moving said enrichment valve toward open position including a pair of expansible chambers separated by a movable wall and a connection between said wall and said valve, means for controlling the pressure difference acting on said wall as a function of said fuel pressure differential, and means including a valve operable concurrently with said valve means for varying the pressure in one of said chambers in accordance with the position of said valve means, said pressure varying means being effective to cause opening of said enrichment valve at a first value of said fuel pressure differential when said valve means is in said first position and at a second lower value when said valve means is in said second position and to vary the increment of opening of said valve in response to a given increment of said fuel pressure differential.

16. A fuel supply system for an internal combustion engine, comprising a conduit for fuel flowing to said engine, a jet system connected in series in said conduit including a plurality of interconnected passages and restrictions for regulating the flow of fuel thru said conduit in accordance with the fuel pressure differential across said jet system, means for varying said fuel pressure differential, first and second fuel passages connecting one side of said jet system and said conduit, a third passage connecting the other side of said jet system and said conduit, valve means for controlling said first and second fuel passages and selectively movable between a first position wherein only said first passage is open and a second position wherein both said first and second fuel passages are open, an enrichment valve for controlling the flow of fuel thru one of said restrictions, means biasing said enrichment valve to closed position, means for moving said enrichment valve toward open position including a pair of expansible chambers separated by a movable wall and a connection between said wall and said valve, a third chamber in said jet system, a second of said restrictions connecting said third chamber and said second passage, a third of said restrictions connecting said third chamber and said third passage, a fourth passage connecting said first passage and said chamber and including at least two restrictions in series therein, a connection between one of said expansible chambers and said fourth passage between said two restrictions, and a connection between the other of said expansible chambers and said third passage, said fourth passage being effective due to pressure variations in said third chamber accompanying movements of said valve means to vary the pressure in said one chamber and hence the value of said fuel pressure differential at which said enrichment valve opens and the relationship between each increment of fuel pressure differential and the increment of valve opening produced thereby.

17. A fuel supply system for an internal combustion engine, comprising a conduit for fuel flowing to said engine, a jet system connected in series in said conduit including a plurality of interconnected passages and restrictions for regulating the flow of fuel thru said conduit in accordance with the fuel pressure differential across said jet system, means for varying said fuel pressure differential, first and second fuel passages connecting one side of said jet system and said conduit, a third passage connecting the other side of said jet system and said conduit, valve means for controlling said first and second fuel passages and selectively movable between a first position wherein only said first passage is open and a second position wherein both said first and second fuel passages are open, an enrichment valve for controlling the flow of fuel thru one of said restrictions, means biasing said enrichment valve to closed position, means for moving said enrichment valve toward open position including a pair of expansible chambers separated by a movable wall and a connection between said wall and said valve, a third chamber in said jet system, a second of said restrictions connecting said third chamber and said second passage, a third of said restrictions connecting said third chamber and said third passage, a fourth passage connecting said first passage and said chamber and including at least two restrictions in series therein, a connection between one of said expansible chambers and said fourth passage between said two restrictions, a connection between the other of said expansible chambers and said third passage, means including a valve operable concurrently with said valve means to vary the pressure in said one expansible chamber, said valve and said fourth passage being effective to vary the pressure in said one chamber and hence the value of said fuel pressure differential at which said enrichment valve opens and the relationship between each increment of fuel pressure differential and the increment of valve opening produced thereby.

18. A fuel supply system for an internal combustion engine, comprising a conduit for fuel flowing to said engine, a jet system connected in series in said conduit including a plurality of interconnected passages and restrictions for regulating the flow of fuel thru said conduit in accordance with the fuel pressure differential across said jet system, means for varying said fuel pressure differential, first and second fuel passages connecting one side of said jet system and said conduit, a third passage connecting the other side of said jet system and said conduit, valve means for controlling said first and second fuel passages and selectively movable between a first position wherein only said first passage is open and a second position wherein both said first and second fuel passages are open, an enrichment valve for controlling the flow of fuel thru one of said restrictions, means biasing said valve to closed position, means responsive to said fuel pressure differential for moving said enrichment valve toward open position, means for varying the rate of opening of said enrichment valve in response to said fuel pressure differential as a function of the position of said valve to control the relationship between said fuel pressure differential and the rate of fuel flow, and means responsive to the position of said valve means to vary the response of said enrichment valve to said fuel pressure differential so as to cause opening of said enrichment valve at a first value of said fuel pressure differential when said valve means is in said first position and at a second lower value when said valve means is in said second position.

19. A fuel supply system for an internal combustion engine, comprising a conduit for fuel flowing to said engine, a jet system connected in series in said conduit including a plurality of interconnected passages and restrictions for regulating the flow of fuel thru said conduit in accordance with the fuel pressure differential across said jet system, means for varying said fuel pressure differential, first and second fuel passages connecting one side of said jet system and said conduit, a third passage connecting the other side of said jet system and said conduit, valve means for controlling said first and second fuel passages and selectively movable between a first position wherein only said first passage is open and a second position wherein both said first and second fuel passages are open, an enrichment valve for controlling the flow of fuel thru one of said restrictions, means biasing said valve to closed position, means responsive to said fuel pressure differential for moving said enrichment valve toward open position, means for varying the rate of opening of said enrichment valve in response to said fuel pressure differential as a function of the position of said valve to control the relationship between said fuel pressure differential and the rate of fuel flow, and means responsive to the position of said valve means to vary the response of said enrichment valve to said fuel pressure differential so as to cause initiation of the opening movement of said enrichment valve at a first value of said fuel pressure differential and to establish a first relationship between each increment of fuel pressure differential and the increment of valve opening produced thereby when said valve means is in said first position and to cause initiation of the opening movement of said enrichment valve at a second value of said fuel pressure differential and to establish a second relationship between each increment of fuel pressure differential and the increment of valve opening produced thereby when said valve means is in said second position.

20. A fuel supply system for an internal combustion engine, comprising a conduit for fuel flowing to said engine, a metering restriction in said conduit for regulating the flow of fuel therethru in accordance with the fuel pressure differential thereacross, means for varying said fuel pressure differential, an enrichment valve connected in parallel with said restriction, means biasing said valve to closed position, means responsive to said fuel pressure differential for moving said enrichment valve toward open position, and means for varying the increment of movement of said valve toward open position in response to a given increment of said fuel pressure differential as a controlled function of the valve position, so that a given increment of fuel pressure differential produces different predetermined increments of valve movement at different positions of said valve, whereby is secured a predetermined rate of flow thru the fuel supply system under varying fuel pressure differentials pertaining to corresponding conditions of engine operation.

21. A fuel supply system for an internal combustion engine, comprising a conduit for fuel flowing to said engine, a metering restriction in said conduit for regulating the flow of fuel therethru in accordance with the fuel pressure differential thereacross, means for varying said fuel pressure differential, an enrichment valve connected in parallel with said restriction, means biasing said valve to closed position, means responsive to said fuel pressure differential for moving said enrichment valve toward open position, and means for varying the increment of movement of said valve toward open position in response to a given increment of said fuel pressure differential as a controlled function of the valve position, so that a given increment of fuel pressure differential produces different predetermined increments of valve movement at different positions of said valve, said last-named means including means responsive to the flow of fuel thru said enrichment valve to reduce the proportion of the total fuel pressure differential effective to move said valve against said biasing means.

22. A fuel supply system for an internal combustion engine, comprising a conduit for fuel flowing to said engine, a jet system connected in series in said conduit including a plurality of interconnected passages and restrictions for regulating the flow of fuel thru said conduit in accordance with the fuel pressure differential across said jet system, means for varying said fuel pressure differential, first and second fuel passages connecting one side of said jet system and said conduit, a third passage connecting the other side of said jet system and said conduit, valve means for controlling said first and second fuel passages and selectively movable between a first position wherein only said first passage is open and a second position wherein both said first and second fuel passages are open, an enrichment valve for controlling the flow of fuel thru one of said restrictions, means biasing said valve to closed position, means responsive to said fuel pressure differential for moving said enrichment valve toward open position, means for varying the increment of movement of said valve toward open position in response to a given increment of said fuel pressure differential as a controlled function of the valve position, so that a given increment of fuel pressure differential produces different predetermined increments of valve movement at different positions of said valve, and means effective when said valve means is in either position and said fuel pressure differential exceeds a predetermined value to establish a predetermined rate of fuel flow thru said jet system.

JOHN M. BARR.

REFERENCES CITED

The following references are of record in the file of this patent:

UNITED STATES PATENTS

| Number | Name | Date |
|---|---|---|
| 1,967,619 | Justheim | July 24, 1934 |
| 2,348,008 | Hunt | May 2, 1944 |
| 2,361,227 | Mock | Oct. 24, 1944 |
| 2,361,228 | Mock | Oct. 24, 1944 |